United States Patent
Jones et al.

(10) Patent No.: US 6,361,033 B1
(45) Date of Patent: Mar. 26, 2002

(54) ROLL CONTROL ACTUATOR

(75) Inventors: Nicholas Jones, Rhuis; Guillaume Dazin, Montmorency; Vincent Pichon, Vincennes, all of (FR)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 09/578,333

(22) Filed: May 25, 2000

(51) Int. Cl.$^7$ ................................................ B60G 21/06

(52) U.S. Cl. .................. 267/187; 188/266.3; 280/5.511

(58) Field of Search .............................. 267/187, 223, 267/218, 273; 280/5.506, 5.507, 5.511, 124.106, 124.166; 188/266.3

(56) References Cited

U.S. PATENT DOCUMENTS

| | | | | |
|---|---|---|---|---|
| 1,992,527 A | * | 2/1935 | Garratt | 192/41 R |
| 2,791,128 A | * | 5/1957 | Geyer et al. | 74/441 |
| 4,683,767 A | * | 8/1987 | Weyer | 74/409 |
| 4,691,582 A | * | 9/1987 | Weyer | 74/509 |
| 5,301,974 A | * | 4/1994 | Knapp | 280/283 |
| 5,575,502 A | * | 11/1996 | Oppitz et al. | 280/689 |
| 5,580,079 A | * | 12/1996 | Pradel et al. | 280/723 |
| 5,700,027 A | * | 12/1997 | Schiffler | 280/723 |
| 5,882,017 A | * | 3/1999 | Carleer | 280/5.508 |
| 6,022,030 A | * | 2/2000 | Fehring | 280/511 |

FOREIGN PATENT DOCUMENTS

| | | |
|---|---|---|
| EP | 0428439 | 5/1991 |
| GB | 2318771 | 6/1998 |

* cited by examiner

Primary Examiner—Robert J. Oberleitner
Assistant Examiner—Lan Nguyen
(74) Attorney, Agent, or Firm—Robert M. Sigler

(57) ABSTRACT

A roll control actuator (34) for installation between first and second axially aligned parts (14,16) of a torsion bar (12) has a cylindrical housing (36) connectable by an end wall (38) to the second part of the torsion bar. A rod (40) is positioned inside the housing, extends out of the other end (42) of the housing, and is connectable to the second part of the torsion bar. A cylindrical inner sleeve (46) is positioned inside the housing between the housing and the rod; and the housing, the rod, and the inner sleeve are coaxial on an axis (A), with the rod being rotatable about the axis relative to the housing. The actuator further has securing means (35,37,44) for securing the rod and the housing together to substantially prevent relative axial movement, first linking means (48,50, 52) disposed between the housing and the inner sleeve and generating rotational movement of the housing about the axis on axial movement of the inner sleeve, and second linking means (54,56,58) disposed between the inner sleeve and the rod, generating rotational movement of the rod about the axis on rotation of the sleeve about the axis and allowing axial movement of the inner sleeve relative to the rod. Control means (66,68) are associated with the inner sleeve to control the relative rotational movement between the rod and the housing.

5 Claims, 2 Drawing Sheets

ROLL CONTROL ACTUATOR

TECHNICAL FIELD

This invention relates to a roll control actuator for a roll control system of a motor vehicle.

BACKGROUND OF THE INVENTION

It is known to provide a roll control system for a motor vehicle which comprises a torsion bar which is formed in two parts, with an actuator positioned between the two parts. The actuator is controllably actuated to either allow free relative rotational movement of the two parts of the torsion bar about their longitudinal axes (for example, during straight line motion of the motor vehicle), or to create a torque between (or lock) the two parts together (for example, during cornering of the motor vehicle). Known roll control actuators, as, for example, described in GB-A-2212770 and GB-A-2220625, are complicated.

SUMMARY OF THE INVENTION

It is an object of the present invention to provide a roll control actuator which overcomes the above mentioned disadvantage.

A roll control actuator in accordance with the present invention for installation between first and second axially aligned parts of a torsion bar comprises a cylindrical housing connectable by an end wall to the second part of the torsion bar; a rod positioned inside the housing, extending out of the other end of the housing, and connectable to the second part of the torsion bar; a cylindrical inner sleeve positioned inside the housing between the housing and the rod; the housing, the rod, and the inner sleeve being coaxial on an axis, the rod being rotatable about the axis relative to the housing; securing means for securing the rod and the housing together to substantially prevent relative axial movement; first linking means between the housing and the inner sleeve, the first linking means generating rotational movement of the housing about the axis on axial movement of the inner sleeve; second linking means between the inner sleeve and the rod, the second linking means generating rotational movement of the rod about the axis on rotation of the sleeve about the axis, and allowing axial movement of the inner sleeve relative to the rod; and control means associated with the inner sleeve to control the relative rotational movement between the rod and the housing.

The roll control actuator in accordance with the present invention is much simpler, and hence easier to assembly, then previously known actuators.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
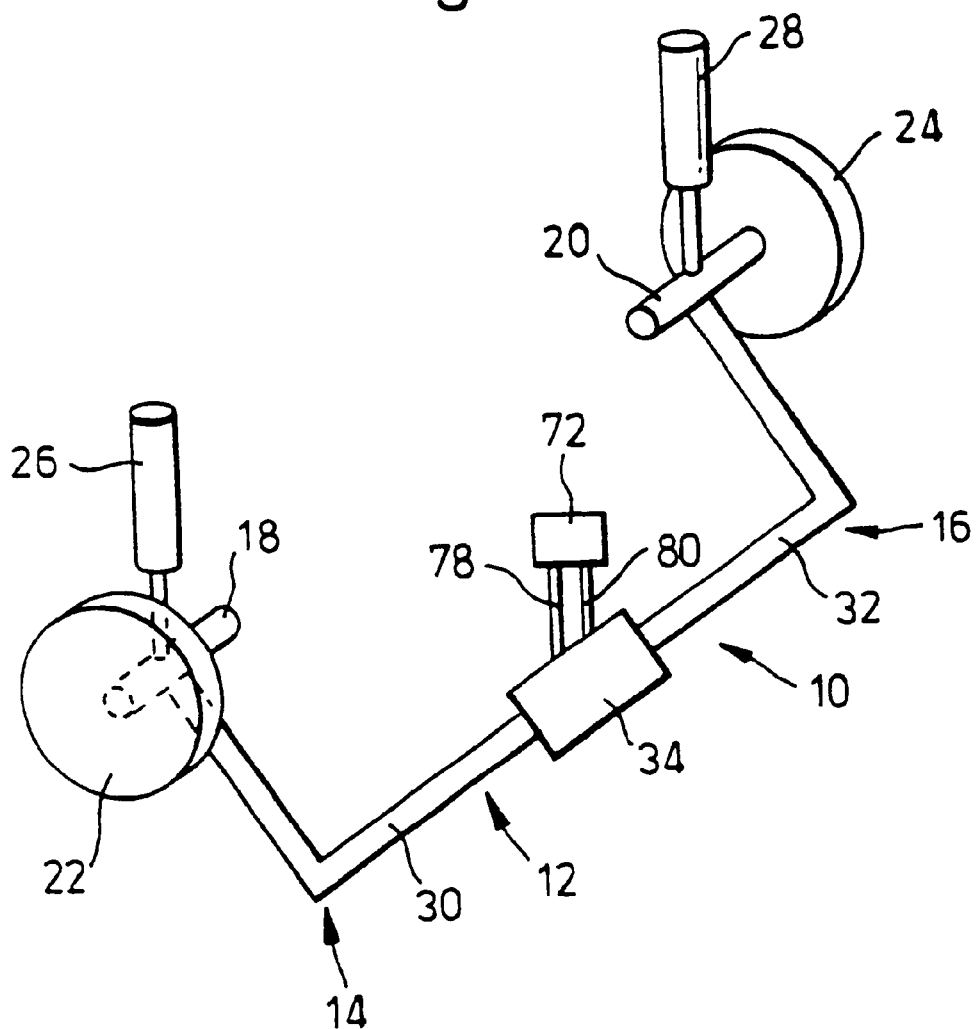
FIG. 1 is a schematic presentation of a roll control system of a motor vehicle including a roll control actuator in accordance with the present invention.

Referring to FIG. 1 of the drawings, the roll control system 10 comprises a torsion bar 12 which is split into first and second parts 14,16, respectively. Each end of the torsion bar 12 is connected to a wheel axle 18, 20 on which a wheel 22, 24 is rotatably mounted. The wheel axles 18, 20 are attached to the vehicle body (not shown) by way of suspension units 26, 28. The first and second parts 14,16 of the torsion bar 12 have portions 30, 32 which are axially aligned. The axially aligned portions 30, 32 are connected by a roll control actuator 34.

Figure 2:
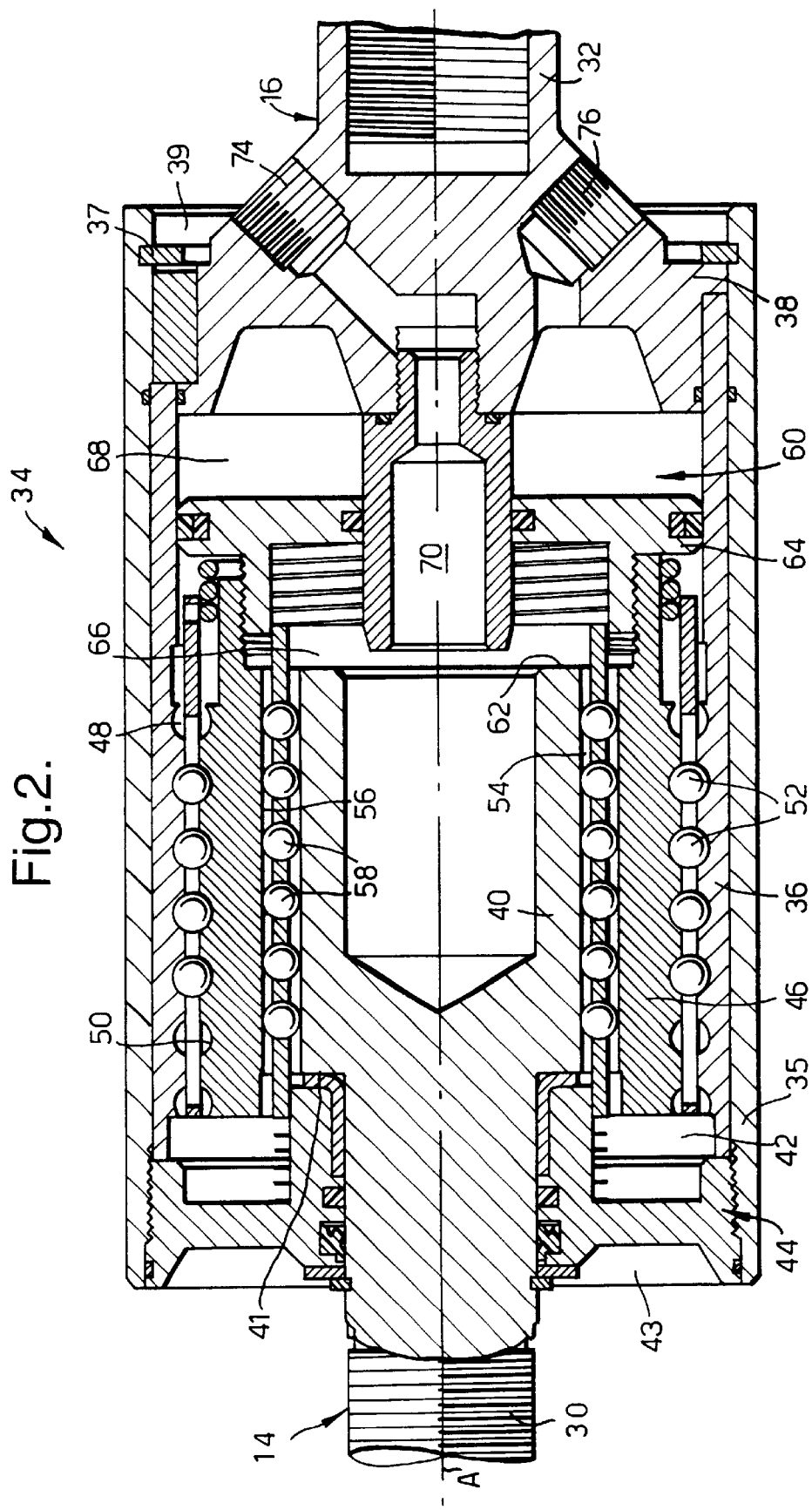
FIG. 2 is a cross-sectional view of the roll control actuator of FIG. 1.

The roll control actuator 34, as shown in FIG. 2, comprises a cylindrical housing 36 connected by an end wall 38 to the portion 32 of the second part 16 of the torsion bar 12. The actuator 34 further comprises a rod 40 positioned inside the housing 36, extending out of the other end 42 of the housing, and connected to the portion 30 of the first part 14 of the torsion bar 12. The housing 36 and the rod 40 are coaxial on axis A. An outer tubular sleeve 35 surrounds the housing 36. The end wall 38 is secured inside the outer tubular sleeve 35 at one end 39 thereof, preferably by a retaining ring 37. A second end wall 44 is secured in the other end 43 of the outer sleeve 35. The end wall 44 engages a shoulder 41 on the rod 40, and the housing 36. The housing 36 is therefore secured between the end walls 38,44 to substantially prevent axial movement of the housing relative to the outer sleeve 35. The second end wall 44 substantially prevents axial movement of the rod 40 relative to the housing 36, but allows rotation of the rod about the axis A relative to the housing.

A cylindrical inner sleeve 46 is positioned inside the housing 36, between the housing and the rod 40, and coaxial on axis A. The cylindrical housing 36 has an internal screw thread 48 with hemi-spherical cross-section adjacent the inner sleeve 46. The inner sleeve 46 has a corresponding external screw thread 50 with hemispherical cross-section adjacent the screw thread 48 in the housing 36. First linking means in the form of balls 52 are rotatably positioned in the screw threads 48,50. Axial movement of the inner sleeve 46 therefore results in rotation of the housing 36 about the axis A. The rod 40 has external, axially extending, hemispherical grooves 54 adjacent the inner sleeve 46. The inner sleeve 46 has corresponding internal, axially extending, hemispherical grooves 56 adjacent the grooves 54 in the rod 40. Second linking means in the form of balls 58 are rotatably positioned in the grooves 54,56. The inner sleeve 46 is therefore capable of sliding in the axial direction relative to the rod 40, but rotational movement of the inner sleeve about the axis A results in corresponding rotational movement of the rod 40 about the axis A.

A chamber 60 is positioned inside the housing 36 between the end wall 38 of the housing and the end 62 of the rod 40. A radially extending piston 64 is positioned in the chamber 60 and is capable of sliding in the axial direction. The piston 64 fluidly isolates first and second fluid chambers 66,68 in the chamber 60. The piston 64 is secured to the inner sleeve 46 such that the inner sleeve and the piston move together. The first fluid chamber 66 is connected to a fluid pump 72 by way of an inlet 74 in the end wall 38 and an axially extending pipe 70 passing through the piston 64, and an external pipe 78. The second fluid chamber 68 is connected to the fluid pump 72 by way of an inlet 76 in the end wall 38 and an external pipe 80. The first and second fluid chambers 66,68 contain fluid which define control means. The pump 72 is actuated by an electronic control unit (not shown) which monitors the steering angle of the wheels 22, 24. The control means controls the relative rotational movement between the rod 40 and the housing 36 as will be explained below.

During straight line driving of the motor vehicle, the pump 72 is not operational, and no fluid pressure is applied to the fluid chambers 66, 68. Should the portion 30 of the first part 14 of the torsion bar 12 rotate about the axis A relative to the portion 32 of the second part 16 of the torsion bar, the rod 40 will rotate about the axis relative to the housing 36. Such relative rotation will cause the inner sleeve 46 to rotate about the axis A and to move in the axial direction relative to the housing 36 because of the interaction of the screw threads 48,50 and the balls 52. As no fluid pressure is present in either of the fluid chambers 66,68, the piston 64 is free to slide in the chamber 60. As a consequence, the torsion bar will have substantially no effect on the motor vehicle.

During cornering of the motor vehicle, the portion 30 of the first part 14 of the torsion bar 12 will attempt to rotate about the axis A relative to the portion 32 of the second part 16 of the torsion bar. Also, during cornering, the pump 72 is operated, and pressurised fluid is applied to the first fluid chamber 66, or to the second fluid chamber 68, dependent on the direction of cornering. The pressurised fluid acts on the piston 64 to drive the piston, and the inner sleeve 46, in the axial direction. Axial movement of the inner sleeve 46 has substantially no effect on the rod 40 (because of the arrangement of the grooves 54,56 and the balls 58), but applies a torque to the housing 36 because of the interaction of the screw threads 48,50 and the balls 52 attempting to rotate the housing about the axis A. As a consequence, the portion 30 of the first part 14 of the torsion bar 12 can be substantially prevented from rotating about the axis A relative to the portion 32 of the second part 16 of the torsion bar, and the torsion bar will provide an anti-roll effect on the motor vehicle.

The balls 52,58 may be replaced by alternative means for linking the housing 36 and the inner sleeve 46, and for linking the inner sleeve with the rod 40. Alternative forms of control means may be used besides the pressurised fluid arrangement described above. For example, a solenoid arrangement may be used for controlling movement of the inner sleeve, in which case the piston may be omitted. As a further alternative, the pump may be replaced by a piston arrangement, or a by-pass valve arrangement.

What is claimed is:

1. A roll control actuator for installation between first and second axially aligned parts of a torsion bar comprising a cylindrical housing connectable by an end wall to the second part of the torsion bar; a rod positioned inside the housing, extending out of the other end of the housing, and connectable to the first part of the torsion bar; a cylindrical inner sleeve positioned inside the housing between the housing and the rod; the housing, the rod, and the inner sleeve being coaxial on an axis, the rod being rotatable about the axis relative to the housing; securing means for securing the rod and the housing together to substantially prevent relative axial movement; first linking means between the housing and the inner sleeve, the first linking means generating rotational movement of the housing about the axis on axial movement of the inner sleeve; second linking means between the inner sleeve and the rod, the second linking means generating rotational movement of the rod about the axis on rotation of the sleeve about the axis, and allowing axial movement of the inner sleeve relative to the rod; and control means associated with the inner sleeve to control the relative rotational movement between the rod and the housing, the first linking means comprising an internal screw thread formed on the housing, an external screw thread formed on the inner sleeve and at least one ball rotatably mounted in the screw threads, wherein the second linking means comprises an external axially extending groove formed in the rod; an internal axially extending groove formed in the inner sleeve; and at least one ball rotatably mounted in the grooves.

2. A roll control actuator as claimed in claim 1, wherein the securing means comprises an outer sleeve positioned around the housing with the end wall secured at one end of the outer sleeve; and a second end wall mounted in the other end of the outer sleeve and engaging the rod and the housing.

3. A roll control actuator as claimed in claim 2, wherein the control means comprises fluid acting on either side of a radially extending piston which is attached to the inner sleeve for axial movement therewith, the fluid being pressurisable to substantially prevent relative rotational movement between the rod and the housing.

4. A roll control actuator as claimed in claim 3, wherein the fluid is held in first and second fluid chambers positioned inside the housing and separated by the piston which makes a sealing sliding fit with the housing.

5. A roll control actuator as claimed in claim 3 or claim 4, wherein the fluid is pressurised by a pump.

* * * * *